US010308531B2

(12) United States Patent
Miknevich et al.

(10) Patent No.: US 10,308,531 B2
(45) Date of Patent: Jun. 4, 2019

(54) COMPOSITION AND PROCESS FOR REMOVING IMPURITIES FROM A CIRCULATING WATER SYSTEM

(71) Applicant: Ecolab USA Inc., St. Paul, MN (US)

(72) Inventors: Joseph P. Miknevich, Coraopolis, PA (US); David W. Scheimann, Joliet, IL (US)

(73) Assignee: ECOLAB USA INC., St. Paul, MN (US)

( * ) Notice: Subject to any disclaimer, the term of this patent is extended or adjusted under 35 U.S.C. 154(b) by 18 days.

(21) Appl. No.: 14/284,522

(22) Filed: May 22, 2014

(65) Prior Publication Data
US 2014/0251921 A1 Sep. 11, 2014

Related U.S. Application Data

(63) Continuation-in-part of application No. 14/068,624, filed on Oct. 31, 2013, which is a continuation-in-part of application No. 12/490,909, filed on Jun. 24, 2009, now Pat. No. 8,591,744.

(51) Int. Cl.
| C02F 1/52 | (2006.01) |
| C08L 3/04 | (2006.01) |
| C08L 1/02 | (2006.01) |
| C02F 1/56 | (2006.01) |
| B05B 14/468 | (2018.01) |
| C11D 3/37 | (2006.01) |
| C11D 3/04 | (2006.01) |
| C02F 1/66 | (2006.01) |
| C08L 3/08 | (2006.01) |
| C02F 103/14 | (2006.01) |
| B05B 15/12 | (2006.01) |

(52) U.S. Cl.
CPC .............. *C02F 1/5245* (2013.01); *C02F 1/52* (2013.01); *C02F 1/5263* (2013.01); *C02F 1/5272* (2013.01); *C02F 1/56* (2013.01); *C08L 1/02* (2013.01); *C08L 3/04* (2013.01); *B05B 14/468* (2018.02); *B05B 15/1281* (2013.01); *C02F 1/66* (2013.01); *C02F 2103/14* (2013.01); *C08L 3/08* (2013.01); *C11D 3/046* (2013.01); *C11D 3/3719* (2013.01)

(58) Field of Classification Search
CPC ...... C08L 3/08; C08L 3/04; C08L 1/02; C02F 1/56; C02F 1/5245; C02F 2103/14; C02F 1/52; C02F 1/66; C02F 1/5263; C02F 1/5272; B05B 15/1281; B05B 14/468; C11D 3/3719; C11D 3/046
See application file for complete search history.

(56) References Cited

U.S. PATENT DOCUMENTS

| 3,578,475 | A | 5/1971 | Alexander et al. |
| 4,435,308 | A | 3/1984 | Thomas et al. |
| 4,564,464 | A | 1/1986 | Harpel et al. |
| 4,888,386 | A | 12/1989 | Huang et al. |
| 4,913,825 | A | 4/1990 | Mitchell |
| 5,068,279 | A | 11/1991 | Morse |
| 5,072,881 | A | 12/1991 | Taube |
| 5,236,598 | A † | 8/1993 | Hunter |
| 5,240,509 | A † | 8/1993 | Rey |
| 5,248,440 | A | 9/1993 | Mitchell et al. |
| 5,250,189 | A † | 10/1993 | Rey |
| 5,259,976 | A | 11/1993 | Bui et al. |
| 5,294,352 | A | 3/1994 | Waldmann |
| 5,719,224 | A | 2/1998 | Agree et al. |
| 5,836,321 | A | 11/1998 | Kaneski et al. |
| 5,972,865 | A | 10/1999 | Knipe, Jr. et al. |
| 6,033,525 | A | 3/2000 | Moffett |
| 6,136,200 | A | 10/2000 | Waldmann |
| 6,485,656 | B1 | 11/2002 | Meyer et al. |
| 6,673,263 | B2 | 1/2004 | Albu et al. |
| 6,858,093 | B2 | 2/2005 | Albu et al. |
| 7,048,859 | B1 * | 5/2006 | Moffett ................. C02F 1/5236 210/666 |
| 7,338,604 | B2 | 3/2008 | Wilson |
| 8,545,600 | B2 | 10/2013 | Dingler et al. |
| 8,591,744 | B2 | 11/2013 | Miknevich et al. |
| 2003/0026906 | A1 | 2/2003 | Albu et al. |
| 2004/0084373 | A1 | 5/2004 | Wilson |
| 2004/0104178 | A1 | 6/2004 | Mahoney et al. |
| 2004/0217326 | A1* | 11/2004 | Souter ...................... C02F 1/50 252/179 |
| 2006/0122086 | A1 | 6/2006 | Albu et al. |
| 2006/0254737 | A1* | 11/2006 | Anderson ............ C08B 31/003 162/175 |
| 2010/0326923 | A1 | 12/2010 | Miknevich et al. |
| 2014/0053872 | A1 | 2/2014 | Balent et al. |
| 2014/0251921 | A1 | 9/2014 | Miknevich et al. |

FOREIGN PATENT DOCUMENTS

| CN | 1919475 | 2/2007 |
| CN | 102091609 A | 6/2011 |
| CN | 102351286 A | 2/2012 |
| EP | 2365037 A1 | 9/2011 |
| JP | 52-31989 | 3/1977 |
| JP | H06114210 | 4/1994 |
| JP | 6-509371 | 10/1994 |
| JP | 07000970 H | 1/1995 |
| JP | H07713 | 1/1995 |

(Continued)

OTHER PUBLICATIONS

International Search Report for PCT/US2014/059351 dated Jan. 8, 2015.

(Continued)

*Primary Examiner* — John Kim
(74) *Attorney, Agent, or Firm* — Eric D. Babych; Brinks Gilson & Lione

(57) ABSTRACT

The invention provides methods and compositions for a composition and/or a method for treating impurities in a circulating water system. The circulating water system impurities may be oversprayed paint in paint spray booth applications. The composition includes an aqueous solution of a cationized starch, a polybasic aluminum salt such as aluminum chlorohydrate or polyaluminum chloride and a solution of a medium to high MW aqueous flocculant. The composition is particularly useful when added to recirculating scrubber water in paint spray booths for effectively treating both water based and solvent based paints.

9 Claims, 1 Drawing Sheet

(56) References Cited

FOREIGN PATENT DOCUMENTS

| | | |
|---|---|---|
| JP | H 0938415 A | 2/1997 |
| JP | 11-500953 | 1/1999 |
| JP | H11672 | 1/1999 |
| JP | 2006061776 | 3/2006 |
| JP | 2007245150 | 9/2007 |
| JP | 2012531301 A | 12/2012 |
| JP | 5523207 | 6/2014 |
| WO | WO 93/02147 | 4/1993 |
| WO | WO 96/26905 | 9/1996 |
| WO | WO 2010/025810 A1 | 3/2010 |

OTHER PUBLICATIONS

International Search Report and Written Opinion for International Application No. PCT/US2010/039323, dated Feb. 22, 2011 (7 pages).
Supplementary European Search Report for related European Application No. 10797543, dated Aug. 7, 2013 (2 pages).
International Search Report and Written Opinion for International Application No. PCT/US2017/039707, dated Sep. 11, 2017 (14 pages).

\* cited by examiner
† cited by third party

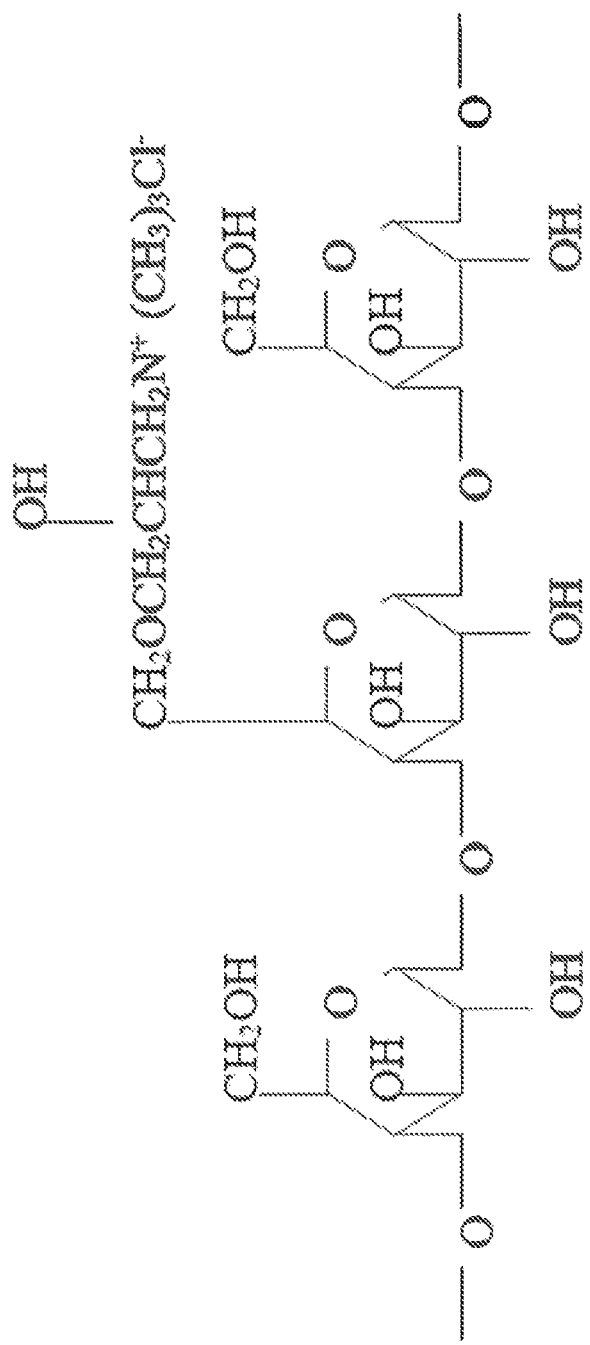

COMPOSITION AND PROCESS FOR REMOVING IMPURITIES FROM A CIRCULATING WATER SYSTEM

CROSS-REFERENCE TO RELATED APPLICATIONS

This application is a continuation in part of co-pending U.S. patent application Ser. No. 14/068,624 filed on Oct. 31, 2013 which itself is a continuation in part of U.S. patent application Ser. No. 12/490,909 filed on Jun. 24, 2009 and which has issued as U.S. Pat. No. 8,591,744.

STATEMENT REGARDING FEDERALLY SPONSORED RESEARCH OR DEVELOPMENT

Not Applicable.

BACKGROUND OF THE INVENTION

This invention relates to improved separation of paint and spray residue from water streams in the painting and finishing industry. The invention allows for improved detackification and sludge separation while still being a new "Greener" technology that greatly reduces its environmental impact. The spray painting of automobile bodies, engines and a variety of industrial and consumer articles is conducted in specialized enclosures called paint spray booths. These booths provide a controlled work area for the painting operations both enhancing worker safety and minimizing the possibility of contaminants adversely impacting the finished paint job. Booths can vary significantly in size and design but all have a work area where the actual painting is done and a backsection/underbooth area where paint overspray is removed from the air. In small or low production systems this is accomplished by pulling the paint laden air through a series of disposable filters. More commonly, a moving stream of air generated by booth exhaust fans pulls the paint overspray through a curtain or spray of recirculating water effectively scrubbing the paint particles from the air into the water phase. The water and scrubbed paint particles are carried to a sump basin where the paint particles are separated from the water so that the water can be recycled and the waste paint solids disposed of safely.

Paint is by definition a highly adhesive film forming material. It tends to readily adhere to any exposed booth surfaces where it can build and eventually reduce air and water flow, block drains, damage pumps and plug screens. This reduces booth efficiency and significantly increases operating costs. For this reason Chemical "detackifiers" are usually added to the recirculating water. These act to improve the scrubbing efficiency of the booth, prevent the paint from adhering to booth surfaces and aid in the collection and removal of paint solids from the recirculating water stream.

In the past, solvent-based or solvent borne paints were most commonly employed in spray booths. More recently increased environmental awareness has resulted in Federal regulations limiting the amount of VOC's that can be released. This has resulted in an increased use of waterborne paints and reformulation of existing solvent based ones to reduce VOC's. These materials, while not as tacky as solvent based ones are much more difficult to separate from water and due to their surfactant load are much more prone towards generating significant amounts of foam and require different treatments than their solvent based analogs. Consequently a need has developed for "detackifiers" that cannot only reduce the stickiness of traditional paints but also deal with the need to control foam and improve collection of newer, reformulated water based and HAPS compatible solvent based paints (ones determined not to contain any materials regulated as Hazardous Air Pollutants). Current economic concerns and environmental awareness has also dictated that these products be cost effective and perform in a "green" sustainable manner.

A wide variety of chemicals have been proposed as treatments for wet spray booth waters containing oversprayed paint including water swellable clays, Mannich type polymers and amphoteric metal salts which form metal hydroxides at pH values>7. For example.

U.S. Pat. No. 4,564,464—Teaches the use of pumpable, hectorite clay containing slurries, containing suitable thinning agents and water conditioning agents such as water-soluble phosphates. While able to treat both solvent and waterborne paints, this type of treatment generates excessive volumes of difficult to dewater sludge and tends to promote unwanted biological growth.

U.S. Pat. No. 4,888,386—Teaches the use of a melamine-formaldehyde based polymer in conjunction with a polyvinyl alcohol and a styrene acrylate copolymer to treat both water and solvent based paints very effectively. However, low levels of free formaldehyde present in this composition as with any Mannich type polymer have raised concerns for worker exposure. In addition, these materials are not easily biodegradable making sludge disposal a concern.

U.S. Pat. No. 5,068,279—Teaches a method for scavenging free formaldehyde from a high activity melamine-formaldehyde type detackifier to improve safety and reduce to VOC. This treated product performs well with all types of paints and is the current global standard. However, it is deemed "old" technology and concerns about formaldehyde and biodegradability persist.

U.S. Pat. No. 5,250,189—Teaches the use of polybasic aluminum salts such as preferably aluminum chlorohydrate (ACH) within designated pH and alkalinity ranges to provide improved collection of water based paints. Although this can do an excellent job in collecting water based paints the treatment provides poor detackification results with solvent borne paint due to the hydrophilicity of the aluminum salt.

A more recent innovation, U.S. Pat. No. 6,673,263B2 Teaches the incorporation of a minute amount (<0.5%) of a chitin-based polymer, "chitosan" under acid conditions to a dilute solution of aluminum chlorohydrate (ACH). The chitosan acts to partially crosslink with the aluminum salt as the pH is increased improving its efficacy as a coagulant. The addition of the chitosan is claimed to make the composition a "green" chemistry.

A Chinese Pat. No. 1919475—Teaches feeding a water-soluble cationic starch to the inlet of the recirculating water pump of a booth and an aluminum salt and/or polyamide based flocculant to the return line. This is potentially a significantly "greener" approach and initially appears similar to the present invention. However, the Chinese patent recognizes the inherent incompatibility of the components and so requires feeding each component separately at a separate feedpoint using a separate pump. This imposes an extra level of difficulty on the process since the individual products must first interact with each other in relatively fixed proportions to effectively detackify and collect the paint solids. By feeding them separately the necessary balance becomes much more difficult to achieve on an ongoing basis.

Accordingly, what is needed is a single component, cost effective, "green" sustainable chemistry that can effectively detackify and collect all types of paint.

The art described in this section is not intended to constitute an admission that any patent, publication or other information referred to herein is "prior art" with respect to this invention, unless specifically designated as such, in addition, this section should not be construed to mean that a search has been made or that no other pertinent information as defined in 37 CFR § 1.56(a) exists.

BRIEF SUMMARY OF THE INVENTION

At least one embodiment of the invention is directed towards a method and/or a composition for addition to a circulating water system containing an impurity. The composition may comprise: a component consisting of cationized starch and a polybasic metal salt. The composition may further comprise a transport component. The transport component may be water. The composition may be a liquid concentrate. The polybasic metal salt may be an amphoteric salt of aluminum. The polymeric aluminum salt may be one or more of or a combination of the following: polyaluminum chloride, polyaluminum silicate sulfate, polyaluminum nitrate, polyaluminum hydroxychiorosuifate, poly aluminum nitrate sulfate and aluminum chlorohydrate. The cationic starch may be one or more of the following: starch, guar gum, gum arabic, hydroxyethyl cellulose, hydroxypropyl cellulose and methylcellulose gum. The cationic starch may have a degree of substitution between 0.01 to 1.0. The water stream of the circulating water system may have a pH from 6.0 to 10.0. The circulating water system may be used with a paint spray unit. The impurity may be a waterborne or solvent borne paint. The composition may be comprised of: 1 to 60% canonized component and 5 to 75% polybasic metal salt. The method may include adding cationized starch to a flow stream of the circulating water system and separately adding a polybasic metal salt to the flow stream. The method may further comprise separately adding a polymer to the flow stream, the polymer having at least 0.1 hydroxyl functionality and at least partially crosslinks when in contact with the polybasic metal salt and wherein the canonized starch does not react with hydroxyl groups on the polymer. The ea ionized starch may be one such that had there been present a polymer having at least 0.1 hydroxyl functionality which would have at least partially crosslinked in the presence of the polybasic metal salt, the cationized starch would not have reacted with hydroxyl groups on that polymer.

Additional features and advantages are described herein, and will be apparent from, the following Detailed Description.

BRIEF DESCRIPTION OF THE DRAWINGS

A detailed description of the invention is hereafter described with specific reference being made to the drawings in which:

FIG. 1 is an illustration of a generalized structure of an aqueous solution of a cationic starch used in the invention.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

To satisfy the long-felt but unsolved needs identified above, at least one embodiment of the invention is directed towards the following key aspects:

1. It is an advantage of the invention to improve detackifying properties in the recirculation of water in the paint and finishing process.
2. It is an advantage of the invention to improve the separation of paint products from the recirculating water in the paint and finishing process.
3. It is an advantage of the invention to provided improve detackifying ability and improve the separation of paint products in the recirculating water in the paint and finishing process while being a Green technology that produces a much lower environmental impact.
4. It is an advantage of the invention to work effectively with a wide range of paint and finishing products with varying analogs.

The present invention includes a composition for treating oversprayed paint The composition includes (a) a 1-35% solution of a cationic starch with a degree of substitution of 0.01-1.0; (b) a 1-50% solution of a polybasic metal salt such as aluminum chlorohydrate, polyaluminum chloride or polyaluminum nitrate; and (c) a 0.1-35% solution of an aqueous polymer (or copolymer or terpolymer) solution containing at least 0.1% hydroxyl functionality and a molecular weight of > or $=2.5\times10^5$. These materials would be combined to give a final composition containing 1 to 60% by weight of the cationized starch, 5 to 75% of the polybasic metal salt and 0.1 to 20% of the polymer. A preferred composition would contain 35 to 55% of the cationized starch 45 to 65% of the polybasic metal salt and 0.1% to 5% of the polymer by weight. The composition is particularly useful as a liquid concentrate that can be added to recirculating water systems in paint spray booths to treat both solventborne (SB) and waterborne (WB) paints.

Another embodiment of the present invention comprises a method of treating oversprayed paint particles in a circulating water system. In such a method, oversprayed paint is contacted with a water system that includes a composition comprising (a) an aqueous solution of a cationic starch, (b) a complex metal salt, (c) a polymer solution having at least 0.1% of hydroxyl functionality and (d) water, where the components a, b, and c are all contained in a single liquid concentrate product, and are applied to the water system simultaneously and at a fixed ratio. The composition as described acts to detackify and flocculate oversprayed paint particles. The method described may also include a step of separating the treated oversprayed paint particles from the water.

The combination of the three components to form a stable, effective composition S is not trivial. The polymer must be able to partially crosslink with the aluminum salt but not so much as to form an insoluble gel. The starch must have enough cationic charge to enable it to interact with the paint solids but not enough to react with the hydroxyl functionality of the polymer. The aluminum salt must be polybasic enough to crosslink with a hydroxyl group on a polymer. To provide a stable product the individual products must he matched to each other. They must be fed in a specific order, in specific proportions in a defined pH range so that they will not interact with each other until fed into the process water.

As previously stated, the instant invention includes an aqueous solution of a cationic starch having the generalized structure illustrated in FIG. 1.

It also includes a polybasic aluminum salt and a polymer containing an amount of a hydroxyl functional group sufficient to allow it to crosslink with the aluminum salt at pH values greater than approximately 5.0.

Starch, sometimes referred to, as amylum is a polysaccharide carbohydrate consisting of a large number of glucose units joined together by glycosidic bonds. Starch is produced by all green plants as an energy store and is a major food source for humans. Pure starch is a white, tasteless and odorless powder that is insoluble in cold water or alcohol. It consists of two types of molecules: the linear and helical amylose and the branched amylopectin.

Depending on the plant, starch generally contains 20 to 25% amylose and 75 to 80% amylopectin.

The base starch referred to in the instant invention maybe derived from any of the common commercially used starch sources including but not limited to wheat, maize (corn), tapioca, potato, rice, sweet potato, sago, rung bean and arrowroot.

Starches may be canonized by several methods. The present invention is independent of the method used to canonize the starch. It does require that the starch has an effective degree of substitution and must be readily available from commercial suppliers, produced by any means. The degree of substitution of a cationic starch is described by the average number of substituents per anhydroglucose unit and has a potential maximum value of three. (The illustration in FIG. 1 is included for informational purposes only and does not consider any branching that may occur off the original amylose unit.) The canonization process produces a polymer having a strong positive charge that improves solubility and permits interaction with negatively charges surfaces. The process also adds an amine functionality to the existing hydroxyl functionality, lending itself to reactive chemistry on either side group. The cationic starch used in the instant invention has a degree of substitution between 0.01 and 1.0 making it suitable for use as a flocculant. It is provided as an aqueous solution of 1 to 35% solids. Suitable products are available commercially from Dober, Alco or ISC.

Other materials that could be canonized and might provide similar performance may include guar gum, gum Arabic, hydroxyethyl cellulose, hydroxypropyl cellulose and methylcellulose gum. The composition of the instant invention further includes a polybasic metal salt that is useful in treating water based or latex types of paints and can interact with polymeric flocculants that contain hydroxyl functionality at neutral or alkaline pH values to form a crosslinked gel. Preferred embodiments would include complex polymeric aluminum salts such as but not limited to polyaluminum chloride (PAC), polyaluminum silicate sulfate (PASS), polyaluminum nitrate, polyaluminum hydroxychlorosulfate and aluminum chlorohydrate. This salt would be provided as an aqueous solution containing from 1 to 50% solids.

The composition also includes a natural or synthetic polymeric flocculant containing at least 0.1% hydroxyl functionality and a molecular weight of at least $2.5 \times 10^5$. The polymer should be easily biodegradable and be capable of reacting with a complex polymeric salt of an amphoteric metal to form a crosslinked gel at neutral or alkaline pH values. Suitable products could include polymers (or copolymers or terpolymers) of synthetic polymers such as acrylamide or natural polymers such as chitosan or guar gum.

The composition of the instant invention is typically prepared by first adding the required amount of starch to a reaction vessel fitted with a mixer. The mixer is turned on and dilute sulfuric acid added if needed to adjust the pH of the starch solution to a value of 5.5 to 6.0. (Other acids can be used if necessary including but not limited to hydrochloric acid, nitric acid, phosphoric acid or acetic acid.) While mixing vigorously, the polymeric flocculant is added to the starch solution and mixed until uniform. (15-30 minutes at 100 rpm should be sufficient). After the starch polymer solution has been mixed thoroughly the polybasic metal salt is added to the mixture while continuing to mix. Significant thickening may be experienced at this point. Continue mixing the resultant blend for an additional 15 to 30 minutes or until it is uniform. The composition of the instant invention is preferably prepared as a liquid concentrate. This concentrate can then be added to the recirculating water system of a paint spray booth for use as a primary detackifying additive and or coagulating additive for oversprayed paint solids. Use concentrations in such systems would typically be in the range of 10 to 1000 ppm based on water flow and paint loading.

In applications of the instant invention, the pH of the recirculating water system is preferably maintained between 6.0 and 10.0 and more preferably between 7.5 and 9.0. Since the composition of the instant invention is slightly acidic, its use may influence the pH of the recirculating water system over time so the pH may have to be periodically adjusted using methods and products commonly used in similar applications such as NaOH, KOH, soda ash or sodium metasilicate.

In the context of the instant invention the detackifying composition previously described is fed to the recirculating water system of a paint booth. The paint overspray makes contact with the recirculating water in the booth scrubber section. In contacting the water containing the instant invention the paint overspray becomes rapidly detackified and coagulated causing it to separate from the system water as a sludge layer.

Additionally, other polymeric compounds may be utilized in conjunction with the composition of the instant invention to act as co-flocculants and facilitate more rapid separation of the paint solids from the recirculating water system. Preferred embodiments would include high molecular weight polymers of acrylamide. These would include copolymers containing amine or hydroxyl functional groups. In addition in conjunction with the invention/composition the following may be performed: 1) the addition of a cationic flocculant and/or an anionic flocculant to pit water, 2) the addition of a cationic flocculant followed by an anionic flocculant to pit water, and/or 3) the addition of an anionic flocculant followed by a cationic flocculant to pit water. The anionic flocculant and/or the cationic flocculant may be of high molecular weight (>100.000 Daltons).

The effectiveness of the inventive composition is quite unexpected in light of the prior art. For example while U.S. Pat. No. 5,719,224 describes the use of a cationic polymer and U.S. Pat. No. 6,485,656 describes the use of a starch none of these references describes the use of a cationic starch.

Without being limited by a particular theory or design of the invention or of the scope afforded in construing the claims, it is believed that the nature of the cationic starch lends it just the right charge and geometry to interact with the paint but not to react with hydroxyl portions of the polymer. The composition in U.S. Pat. No. 5,719,224 comprises tannins but its cationic portion comes from a different material so its tannins' are dissimilar from the invention's cationic starch.

In at least one embodiment, after the paint is detackified it is passed on to a receptacle including but not limited to a pit where an additional cationic flocculant is added as the water and detackified paint return to the receptacle from the paint spray booths. The additional flocculant may be for the purpose of agglomerating the detackified paint particles and improving flotation. This may result in a sludge which may moves across the surface of the receptacle to a weir box or similar vessel where the floating material is skimmed off and transferred to a Palin or sludge removal device. As the sludge enters the Palin it may be treated with another flocculant addition (possibly a cationic or maybe an anionic depending upon the application).

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should he understood that the invention encompasses various changes and modifications to the examples described herein and such changes and modifications can be made without departing from the spirit and scope of the invention and without diminishing its intended advantages, it is therefore intended that such changes and modifications he covered by the appended claims.

To demonstrate the effectiveness of the instant invention the following procedure was employed. For each test, 200 mls of cold tap water was added to an open mouth, one-pint glass jar equipped with a magnetic stir bar. While stirring at high speed, 0.2 ml of the product to be evaluated was added to the jar and the pH adjusted to 8-9 with caustic if needed. As stirring continued, 10-12 drops (0.5 ml) of a mixture of commercially available automotive paints was added to the vortex. The samples were allowed to mix for 30 seconds then 1.5 ml of a 1% solution of Nalco ULTIMER 7757 added to facilitate separation of the paint solids and allowed to mix for an additional 30 seconds after which time the mixer was turned off. After allowing the sample to stand for 30 seconds the samples were evaluated for tackiness and final water quality. Separate tests were run for each composition utilizing mixtures of solvent home basecoats and water borne basecoats respectively.

Example 1

This example demonstrates the effectiveness of the instant invention with a composition prepared as described previously as Treatment "A".

| Paint | Tack | Smear | Sludge Appearance | Water clarity (ntu) |
| --- | --- | --- | --- | --- |
| SB Blend | None | None | Fluffy | Good 4.7 |
| WB Blend | None | None | Fluffy | Good 6.8 |

Example 2

The subsequent examples demonstrate the importance of each of the components in the performance of the instant invention. In example 2, the polymeric component has been removed leaving only the cationic starch and the aluminum chlorohydrate (ACE). (In this and all subsequent examples the amounts of the remaining chemistry was increased to maintain an equal active solids for all tests.)

| Paint | Tack | Smear | Sludge Appearance | Water clarity (ntu) |
| --- | --- | --- | --- | --- |
| SB Blend | Poor v. sticky | Poor smeary | Wet sticky | Poor 105 |
| WB blend | None | some | Not cohesive | Poor 112 |

Example 3

In example 3, the cationic starch component has been removed leaving only the polymer and aluminum chlorohydrate (ACC).

| Paint | Tack | Smear | Sludge Appearance | Water clarity (ntu) |
| --- | --- | --- | --- | --- |
| SB Blend | Poor stringy | Poor Smeary | Gooey blobs | Poor 89 |
| WB Blend | None | Slight | Wet v. fine | Fair 51 |

Example 4

In example 4, the aluminum chlorohydrate (ACM has been removed leaving only the polymer and cationic starch.

| Paint | Tack | Smear | Sludge Appearance | Water clarity (ntu) |
| --- | --- | --- | --- | --- |
| SB Blend | Fair sl tacky | Poor smeary | Gooey blobs | Poor 99 |
| WB Blend | Some | none | Rubbery blob | Poor 104 |

In at least one embodiment a single composition comprising the cationic starch, metal salt and crosslinking polymer is fed. In at least one embodiment, one, some, or all of the individual components may be fed separately or in different combinations. For example, the cationic starch and aluminum salt may be pre-mixed and fed together as a single product while the crosslinking polymer may be ted separately but adjacent to where the pre-blend is added or later as a portion of the co-flocculant added to assist collection.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to he illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A composition for addition to a circulating water system containing an impurity, the composition consisting of: a cationized corn starch, water, and a polybasic metal salt, wherein the cationized corn starch comprises a quaternary amine, wherein the quaternary amine is —$N^+(CH_3)_3Cl^-$, and the composition does not include a polyacrylamide polymer.

2. The composition of claim 1, wherein the composition comprises 1 to 35% by weight cationized corn starch.

3. The composition of claim 1, wherein the composition comprises 35 to 55% by weight of the cationized corn starch and 45 to 65% by weight of the polybasic metal salt.

4. The composition of claim 1, wherein the cationized corn starch has a degree of substitution of between 0.01 to 1.0.

5. The composition of claim 1, wherein the composition is a liquid concentrate.

6. The composition of claim 1, wherein the polybasic metal salt is an amphoteric salt of aluminum.

7. The composition of claim 6, wherein the amphoteric salt of aluminum is selected from the group consisting of: polyaluminum chloride, polyaluminum silicate sulfate, polyaluminum nitrate, polyaluminum hydroxychlorosulfate, poly aluminum nitrate sulfate, aluminum chlorohydrate, and any combination thereof.

8. A method of removing impurities from a circulating water system comprising:
adding the composition of claim 1 to the circulating water system, the circulating water system comprising oversprayed paint particles;
adding a polymer solution having at least 0.1% of hydroxyl functionality;
flocculating the oversprayed paint particles; and
separating the oversprayed paint particles from water in the circulating water system.

9. The method of claim 8, wherein a water stream of the circulating water system has a pH from 6.0 to 10.0.

* * * * *

UNITED STATES PATENT AND TRADEMARK OFFICE
CERTIFICATE OF CORRECTION

PATENT NO. : 10,308,531 B2
APPLICATION NO. : 14/284522
DATED : June 4, 2019
INVENTOR(S) : Joseph P. Miknevich et al.

It is certified that error appears in the above-identified patent and that said Letters Patent is hereby corrected as shown below:

On the Title Page

In item (54), and in the Specification, in Column 1, Line 1, delete "PROCESSFOR" and insert -- PROCESS FOR --, therefor.

Signed and Sealed this
Seventeenth Day of September, 2019

Andrei Iancu
*Director of the United States Patent and Trademark Office*